US008836511B2

(12) United States Patent
Gravelle et al.

(10) Patent No.: US 8,836,511 B2
(45) Date of Patent: *Sep. 16, 2014

(54) RFID VEHICLE TAG WITH MANUALLY ADJUSTABLE DATA FIELDS

(71) Applicants: Kelly Gravelle, Poway, CA (US); Charles A. Johnson, Albuquerque, NM (US); Matthew K. Burnett, Albuquerque, NM (US); Dale L. Scott, Albuquerque, NM (US)

(72) Inventors: Kelly Gravelle, Poway, CA (US); Charles A. Johnson, Albuquerque, NM (US); Matthew K. Burnett, Albuquerque, NM (US); Dale L. Scott, Albuquerque, NM (US)

(73) Assignee: Amtech Systems, LLC, Albuquerque, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/685,101

(22) Filed: Nov. 26, 2012

(65) Prior Publication Data
US 2013/0080216 A1  Mar. 28, 2013

Related U.S. Application Data

(63) Continuation of application No. 12/533,067, filed on Jul. 31, 2009, now Pat. No. 8,344,886.

(51) Int. Cl.
*G08B 13/14* (2006.01)

(52) U.S. Cl.
USPC ........................................ 340/572.1; 340/505

(58) Field of Classification Search
USPC ............... 340/572.1, 572.4, 572.7, 505, 10.1, 340/926; 235/384
See application file for complete search history.

(56) References Cited

U.S. PATENT DOCUMENTS

| | | | |
|---|---|---|---|
| 5,809,142 A | 9/1998 | Hurta et al. | |
| 5,920,057 A | 7/1999 | Sonderegger et al. | |
| 6,980,101 B2 | 12/2005 | Kelley | |
| 7,016,311 B2 | 3/2006 | Tiernay et al. | |
| 7,091,880 B2 | 8/2006 | Sorensen | |
| 7,224,291 B2 | 5/2007 | Hassett | |
| 7,388,501 B2 | 6/2008 | Tang et al. | |
| 7,450,010 B1 | 11/2008 | Gravelle et al. | |
| 7,548,153 B2 | 6/2009 | Gravelle et al. | |
| 7,782,206 B2 | 8/2010 | Burnett et al. | |
| 7,990,286 B2 | 8/2011 | Shankwitz et al. | |
| 8,013,760 B2 | 9/2011 | Turnock et al. | |
| 8,055,534 B2 | 11/2011 | Ashby et al. | |
| 8,135,614 B2 | 3/2012 | Allen et al. | |
| 8,344,886 B2 * | 1/2013 | Gravelle et al. | 340/572.1 |
| 2003/0001755 A1 | 1/2003 | Tiernay et al. | |
| 2004/0206610 A1 | 10/2004 | Hasegawa et al. | |
| 2004/0227616 A1 | 11/2004 | Lafferty | |
| 2006/0109085 A1 | 5/2006 | Tiernay et al. | |
| 2006/0253249 A1 | 11/2006 | Bruelle-Drews | |
| 2006/0267736 A1 | 11/2006 | Tiernay et al. | |
| 2008/0218313 A1 | 9/2008 | d'Hont et al. | |
| 2009/0243858 A1 | 10/2009 | Burnett et al. | |
| 2012/0098439 A1 | 4/2012 | Recker et al. | |

* cited by examiner

*Primary Examiner* — John A Tweel, Jr.
(74) *Attorney, Agent, or Firm* — Caesar, Rivise, Bernstein, Cohen & Pokotilow, Ltd.

(57) ABSTRACT

An RFID tag for use in a vehicle for use in an electronic toll collecting system. The tag is capable of transmitting data to a tag interrogator indicating the occupancy status of the vehicle. In an embodiment, the tag has a user input and a visual and audible tag status indicator. The user input is used to change the occupancy status of the tag, wherein the occupancy status is a portion of a message sent by radio frequency to the interrogator when the vehicle passes through a toll area.

8 Claims, 2 Drawing Sheets

RFID VEHICLE TAG WITH MANUALLY ADJUSTABLE DATA FIELDS

CROSS-REFERENCE TO RELATED APPLICATIONS

This utility application is a continuation under 35 U.S.C. §120 of non-provisional patent application Ser. No. 12/533,067 filed on Jul. 31, 2009, which claims the benefit under 35 U.S.C. §119(e) of Provisional Application Ser. No. 61/085,338 filed on Jul. 31, 2008 and entitled RFID Vehicle Tag with Manually Adjustable Data Fields, the entire disclosures of which are incorporated by reference herein.

FIELD OF THE INVENTION

This invention relates generally to RFID transponder systems and more particularly to RFID transponders for use in electronic toll collection systems.

BACKGROUND OF THE INVENTION

In response to the inability of conventional toll collection means to meet the demands created by increased highway traffic, automated toll facilities that provide improved toll collection methods and systems have been proposed and are being implemented. These electronic toll collection systems eliminate the manual transactions of conventional toll collection means through the use of radio transmitters and receivers that perform the necessary transactions as a vehicle travels through the automated toll booth. For example, U.S. Pat. No. 7,224,291 (Hassett), which is assigned to the same assignee as this invention, discloses a system for automatic collection of tolls includes an in-vehicle toll processor (e.g., an RFID transponder or tag) having memory for storing a toll-money-available quantity purchased by the user, and a toll-facility-identification site that transmits a toll-facility-identifier signal indicating the identity of the upcoming toll facility. As the vehicle approaches the identification site, the in-vehicle processor receives the identifier signal and calculates the toll to be debited. When the vehicle passes through the toll facility, the in-vehicle processor transmits its identity, its net balance and the toll, which it debits from an account balance. The in-vehicle processor may increment a low balance, in which case it transmits information which is relayed to a central system for billing. Note that all references cited herein are incorporated by reference.

In some electronic toll collection applications, it would be desirable to vary the information transmitted by the RFID tag based on vehicle conditions. One example is a toll road with high occupancy toll (HOT/HOV) lanes. Highway administrations have created incentives for drivers to carpool by assigning differing toll amounts to single person vehicles versus multiple person vehicles and by allowing multiple person vehicles in lanes reserved for such vehicles. Presently, there are not available RFID tags for automated toll collection that provide for adjusting the data message sent by the tag. Therefore a need exists for a vehicle RFID tag that allows the driver to manually change the data sent by the tag to the toll system.

SUMMARY OF THE INVENTION

An RFID tag for installation in a vehicle for use in an electronic toll collecting system. The tag 100 is capable of transmitting data to a tag interrogator 21 indicating the occupancy status of the vehicle. In an embodiment, the tag has a user input and a visual and audible tag status indicator. The user input is used to change the occupancy status of the tag, wherein the occupancy status is a portion of a message sent by radio frequency to the interrogator when the vehicle passes through a toll area.

Other advantages and novel features of the invention will become apparent to those skilled in the art upon examination of the following detailed description of a preferred embodiment of the invention and the accompanying drawings.

DESCRIPTION OF THE PREFERRED EMBODIMENT OF THE INVENTION

The invention relates to the concept of an RFID tag whose state can be changed by the driver or vehicle occupant to indicate an occupancy status. This is for use in High Occupancy Toll (HOT) systems where the toll charged is different depending upon occupancy.

The prior art is a system where the tag is in place when occupancy is single for example, so a toll is collected. When occupancy is more than one the tag is removed, or disabled, so that the tag is not read and no toll is collected. Other prior art is a switched transponder where the tag is turned on and off, similar to removing or disabling the tag.

The invention is useful for at least two reasons. First, it allows electronic toll collection with a vehicle tag that has more than two states so that authorities can more finely manage occupancy, for example they can charge no toll for HOV-3; a reduced toll for HOV-2, full toll for single occupant vehicles. Another aspect is that unlike current systems, which disable or turn off the tag for HOV's, in the inventive tag, the tag is not turned off, but its state is changed and a tag is read. This is helpful in implementation of enforcement systems as there is always a one to one match between vehicles and transponders.

Figure 1:
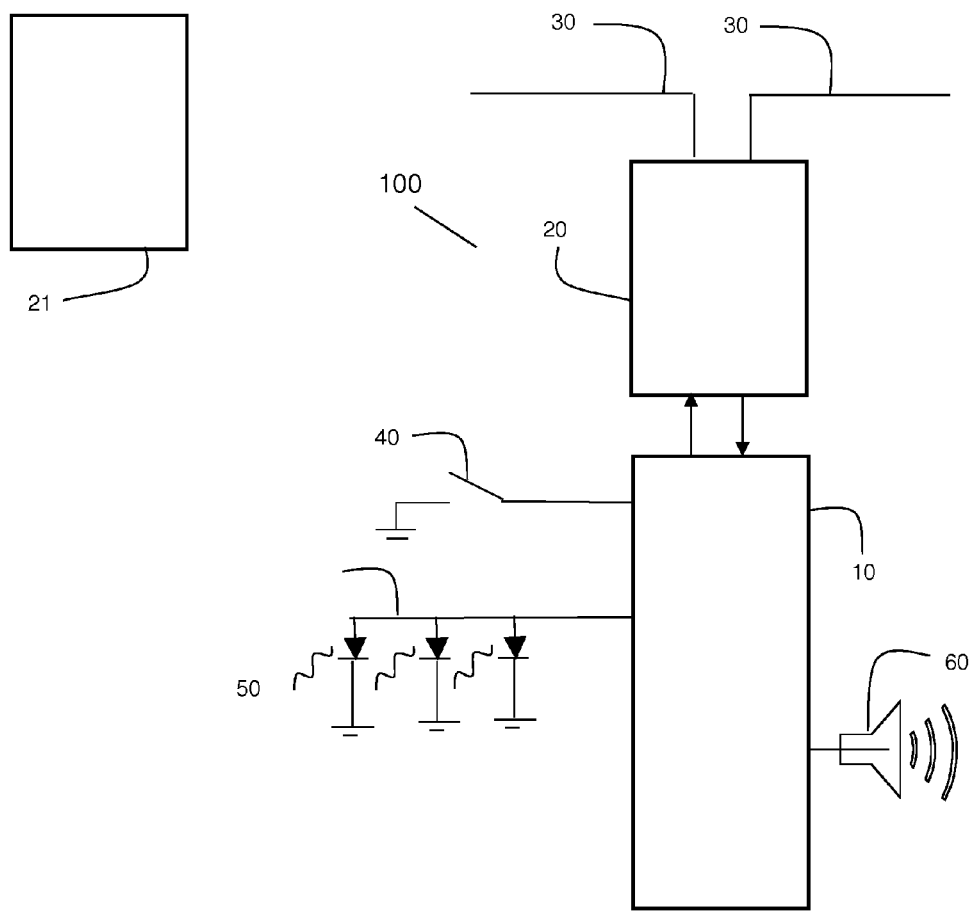
FIG. 1. is a block diagram of an embodiment of an RFID tag with manually adjustable data.

FIG. 1 shows an embodiment of a vehicle tag 100, which includes a processor 10, RF electronics 20, an antenna 30, a manual input momentary contact switch, 40 and a plurality of light emitting diodes, (LEDs) 50. One skilled in the art will understand the details of how the RF electronics sends and receives information to and from a tag interrogator, typically located at toll areas and how the RF electronics converts the RF signal received from the interrogator to digital data for the processor 10, and converts data from the processor 10 to an RF signal. The processor 10 may be a microprocessor that executes a program or it may be a more simple collection of digital logic elements that implements a state machine. In any event, the processor encodes information unique to the tag such that when the vehicle passes the tag interrogator at the toll area, the tag interrogator receives this data, identifies the vehicle and uses this information for billing the tag holder for the cost of the toll. Systems for performing the tag interrogation and billing functions are known in the art.

The tag 100 includes a momentary contact switch 40 that is accessible by the tag user. The switch 40 provides a user input to the processor that allows the user to change the state of the tag, including the information that the tag sends to the tag interrogator at the toll area.

In an embodiment, the tag is in a single occupant state when power to the tag is first applied. By pressing the switch 40, once, the tag confirms its single occupant status by lighting one of the LEDs 50. If the switch 40 is pressed a second time, within a short period of time, e.g. two seconds, the tag will go into two-occupant mode, and will display this by momentarily lighting two of the LEDs 50. If the switch 40 is pressed a third time, again within a short period of time from the second pressing, the tag will go into a three-or-more occupant mode, and signal this with a momentary lighting of three of the LEDs 50.

Figure 2:
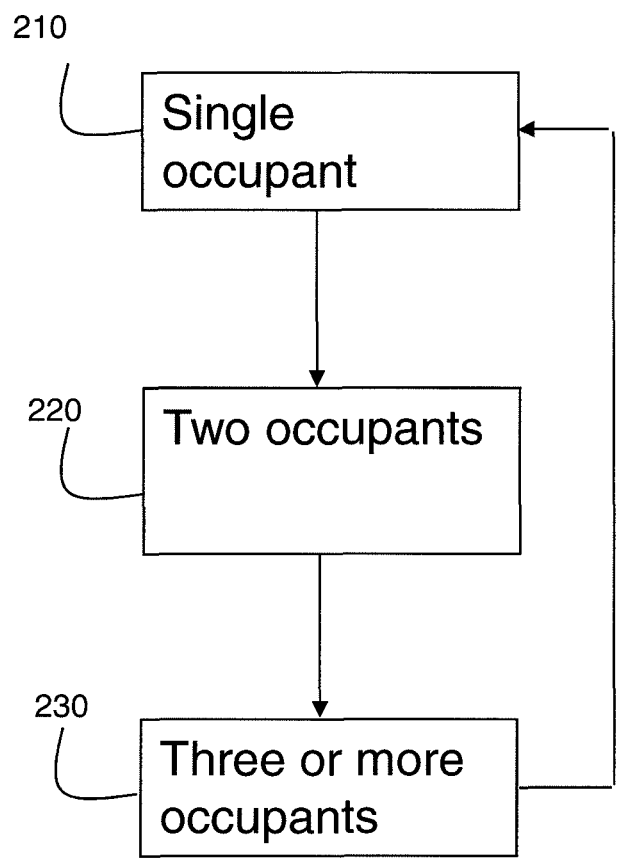
FIG. 2. is a flow diagram of occupant states of a vehicle RFID tag.

In an embodiment, there are three possible states as discussed above. A fourth pressing of the switch 40, within a short period of time would return the tag to the single occupant mode. The flow of these three modes is illustrated in FIG. 2, with single occupant mode 210, two occupant mode 220 and three-or-more occupant mode, 230.

In an embodiment, the LEDs 50 only remain illuminated for a short period of time after the user has set the occupancy level. Pressing the switch 40 after the LEDs 50 have gone off will cause the LEDs 50 to indicate the present occupancy state. Further presses of the switch 40 will cause the tag to advance to the next occupancy level, according to the chart in FIG. 2.

In a further embodiment, the LEDs also indicate other information about the tag when the occupancy mode is not being set. For example, the LEDs can indicate whether the tag is valid or has sufficient funds associated with it when the vehicle passes through the toll area and receives this information from the tag interrogator.

The embodiment shown in FIG. 1 also includes an audio output 60. The audio output tracks the indication of occupancy state as indicated by the LEDs. When one LED is lit, the audio output makes a single beep or buzz. When the state is two occupants, a double beep or buzz is made, and when the state is three-or-more occupants, three beeps or buzzes are activated. This allows the driver to change status without looking at the device. As is the case with the LEDs, the audio output 60 may indicate other information when the tag is not being set to an occupancy level. The audio output 60 may be a simple beeper or buzzer, or may be a speaker that produces fully formed words where the processor is capable of producing such a signal.

The embodiment described above is not intended to limit the invention. For example, the momentary switch 40 can be a capacitive switch, or can be a capacitive sensor that allows for finger position information to be read by the processor. Such a sensor would enable the user to set the occupancy mode by moving a finger along the sensor. Such sensors are well known in the art and implemented, for example in portable music playback devices. The input switch could also be a hall-effect device or magnetic reed switch such that a magnet could be used to open and close the switch. The input device could also be a photosensitive device such as a photodiode or photocell such that a light input could be used to open and close the switch. The user feedback mechanism is not limited to LEDs, but can also be Liquid Crystal Diodes, electro magnetic displays and the like. The invention is not limited to three occupancy states or three LEDS. For example, a fourth occupancy state would be a "bus" state for vehicles capable of carrying more than 6 passengers. The invention is not limited to the use of the ability to externally alter tag states for use in indicating vehicle occupancy status. For example, the tag state may be altered to indicate the type of vehicle for which it is being used. Or the tag state may be altered to indicate states of a variable toll rate where the user may be charged differing rates based on other factors such as how the toll fee is paid, how often the tag is used or whether the vehicle is being used for charitable or humanitarian purposes. Instead of multiple LED's or other visual indicators, a single device can be used and instead of the number of illuminated devices signaling a particular status, the single device is strobed on and off a number of times to indicate tag status.

Embodiments of tags having the features of the invention include some or all of the following features: a tag capable of use in multiple protocols, including Super eGo™, ATA and IAG modes; high speed, high performance suitable for high occupancy toll (HOT) and traffic management applications; tag operating status indicated by light emitting diodes (LEDs) and audio buzzer; read and write capability in any of the protocol modes it is useable with; enhanced data security with advanced anti-spoofing and anti-counterfeiting techniques; partitioned data fields for fixed factory and agency data; impact resistant, molded plastic cases available in multiple colors; non-replaceable internal battery with a ten year design life, based on typical usage; internal windshield mounting. Publications in the field of multiple protocol and multiple mode tags include: U.S. Pat. Nos. 7,548,153 and 7,016,311; and U.S. Application Pub. nos. 2006/0267736 and 2006/0109085. In the field of enhanced security features is U.S. Pat. No. 7,450,010.

Further embodiments include a high speed, high performance radio frequency identification (RFID) tag suitable for electronic toll collection and traffic management applications where driver feedback is specified. The tag is a read write on-board-unit ("OBU") that supports adding and editing data to the OBU at high speeds in real time. EZGo Anywhere Feedback OBUs are designed for high occupancy toll (HOT) applications and feature a push button that, when depressed, causes the OBU to transition from one operating state to another. LEDs, an audible buzzer or both will advise the driver of up to four statuses, for example, "single occupancy" vehicle, "double occupancy vehicle", "bus", etc. In normal road tolling applications, the LEDs and buzzer are used for driver feedback such as: valid tag; low balance; invalid tag and lost/stolen tag The eZGo Anywhere Feedback OBU enables advanced security techniques that ensure a tag's authenticity while preventing data corruption and/or alteration. In addition, tag cloning, spoofing, copying, or duplicating is prevented. All eZGo Anywhere OBUs support factory programming of fixed data fields that are locked at the factory and cannot be reprogrammed. Agency programmed fixed data fields can optionally be locked by the agency after programming using password protected programming equipment. eZGo Anywhere OBU cases are constructed of highly durable, impact resistant, molded plastic and are available in white, blue, orange, green, and yellow colors. Markings on the OBU assist patrons in the proper installation and orientation. Other multiprotocol eZGo Anywhere OBUs include: Standard Waterproof, and Exterior. The eZGo Anywhere Feedback OBU provides 3 light emitting diodes (LEDs) and an audible buzzer. When used in high occupancy toll (HOT) applications, the A/V indicators provide driver feedback as to the number of occupants in the vehicle. When used in normal road tolling applications, the A/V indicators provide driver feedback regarding account status.

We claim:
1. A system for electronic toll collection comprising:
a tag interrogator;
and
a tag comprising a manual user input and an audible or visual status indicator, wherein
said manual user input sets a state of said tag, said tag interrogator reads said state and said interrogator performs an action based on said state of said tag and wherein said status indicator indicates said state upon said setting of said state and further indicates a status of a second tag attribute in response to a stimulus other than said setting of said state.

2. The system of claim 1, wherein said action relates to a fee amount collected based on said state.

3. The system of claim 1, wherein said state is related to one of the group consisting of vehicle occupancy, vehicle size and purpose of vehicle use.

4. The system of claim 1, wherein said second tag attribute is indicated when the tag is interrogated.

5. The system of claim 4, wherein said second tag attribute is one of the group consisting of tag validity and account status.

6. A method of collecting a charge related to vehicle operation for a vehicle having an RFID tag comprising:
   providing the tag with a manual user input;
   setting a tag attribute with said manual user input;
   reading said tag attribute by a tag interrogator;
   indicating by said tag said tag attribute state upon said setting; and
   further indicating a status of a second tag attribute in response to a stimulus other than said setting and
   determining the amount of the charge based at least in part on said tag attribute.

7. The method of claim 6 wherein said tag attribute is related to one of vehicle occupancy, vehicle size and purpose of vehicle use.

8. The method of claim 6, wherein said second tag attribute is from the group consisting of tag validity and account status.

* * * * *